US006824818B2

(12) United States Patent
McCoy et al.

(10) Patent No.: US 6,824,818 B2
(45) Date of Patent: Nov. 30, 2004

(54) WET ON WET PROCESS FOR PRODUCING FILMS

(75) Inventors: Kenda McCoy, Monroe, NC (US); Mark A. Beard, Charlotte, NC (US)

(73) Assignee: Soliant LLC, Lancaster, SC (US)

( * ) Notice: Subject to any disclaimer, the term of this patent is extended or adjusted under 35 U.S.C. 154(b) by 362 days.

(21) Appl. No.: 10/034,106

(22) Filed: Dec. 27, 2001

(65) Prior Publication Data

US 2003/0124254 A1 Jul. 3, 2003

(51) Int. Cl.[7] ............................ B41M 3/12; B05D 1/38; B05D 3/00; B05C 5/04; B29C 47/04

(52) U.S. Cl. .................... 427/146; 427/402; 427/412.1; 427/372.2; 118/313; 118/315; 118/316; 428/202; 428/204; 428/914; 156/238; 156/244.11

(58) Field of Search ................................ 156/230, 231, 156/235, 238, 239, 246, 241, 247, 242, 244.11, 277, 289; 427/146, 147, 148, 402, 412.1, 372.2; 428/40.1, 40.9, 41.2, 41.6, 41.7, 41.8, 424, 423, 195.1, 200, 202, 204, 207, 208, 343, 347, 348, 355 AC, 914; 118/313, 314, 315, 316

(56) References Cited

U.S. PATENT DOCUMENTS

| | | | |
|---|---|---|---|
| 2,761,417 | A | 9/1956 | Russell et al. |
| 2,761,419 | A | 9/1956 | Mercier et al. |
| 2,761,791 | A | 9/1956 | Russell |
| 2,942,293 | A | 6/1960 | Wahl |
| 3,005,440 | A | 10/1961 | Padday |
| 3,413,143 | A | 11/1968 | Cameron et al. |
| 3,474,758 | A | 10/1969 | Russell |
| 3,508,947 | A | 4/1970 | Hughes |
| 3,526,528 | A | 9/1970 | Takahashi et al. |
| 3,539,426 | A | 11/1970 | Nakai et al. |
| 3,627,564 | A | 12/1971 | Mercier |
| 3,711,312 | A | 1/1973 | Yoshida et al. |
| 3,749,053 | A | 7/1973 | Timson |
| 3,756,195 | A | 9/1973 | Mercier |
| 3,893,410 | A | 7/1975 | Herzhoff et al. |
| 3,928,678 | A | 12/1975 | Jackson |
| 3,928,679 | A | 12/1975 | Jackson et al. |

(List continued on next page.)

FOREIGN PATENT DOCUMENTS

| | | | | |
|---|---|---|---|---|
| DE | 3235151 A1 | * 3/1984 | | B05C/5/02 |
| JP | 2000-263589 | * 9/2000 | | B29C/45/16 |
| WO | WO 00/51799 | * 9/2000 | | B29C/37/00 |

*Primary Examiner*—J. A. Lorengo
(74) *Attorney, Agent, or Firm*—Kennedy Covington Lobdell & Hickman LLP

(57) ABSTRACT

An apparatus and method of making a decorative sheet material is provided whereby complex multi-layer films are produced with enhanced efficiency and assurance of quality. The method involves directing a flexible carrier film through a coating station; depositing onto the surface of the carrier film a first coating layer of a solvent based clear coat composition; depositing onto the first coating layer a second coating layer of a solvent based pigmented color coat composition; directing the thus coated carrier film from said coating station through a drying station and drying said first and second coating layers; directing the thus coated and dried carrier film through a coating station; depositing onto the surface of the dried second coating layer a third coating layer of a solvent based primer composition; depositing onto the third coating layer a fourth coating layer of a solvent based adhesive composition; and directing the thus coated film from said coating station through a drying station and drying said third and fourth coating layers. Preferably, the first two depositing steps are performed during a first pass through said coating station, and the second two depositing steps are performed during a second pass through the same coating station.

10 Claims, 5 Drawing Sheets

U.S. PATENT DOCUMENTS

| | | | | | |
|---|---|---|---|---|---|
| 3,958,532 | A | | 5/1976 | Timson | |
| 4,113,903 | A | | 9/1978 | Choinski | |
| 4,143,190 | A | | 3/1979 | Choinski | |
| 4,154,879 | A | | 5/1979 | Choinski | |
| 4,221,184 | A | | 9/1980 | Gref et al. | |
| 4,357,370 | A | | 11/1982 | Alheid | |
| 4,603,064 | A | | 7/1986 | Kania | |
| 4,791,168 | A | | 12/1988 | Salatin et al. | |
| 4,818,589 | A | * | 4/1989 | Johnson et al. | 156/230 |
| 5,044,305 | A | | 9/1991 | Shibata et al. | |
| 5,175,028 | A | | 12/1992 | Tanaka et al. | |
| 5,279,862 | A | | 1/1994 | Corcoran et al. | |
| 5,356,669 | A | | 10/1994 | Rehfuss et al. | |
| 5,356,670 | A | | 10/1994 | Briggs et al. | |
| 5,360,644 | A | | 11/1994 | Briggs et al. | |
| 5,458,925 | A | | 10/1995 | Hirshburg et al. | |
| 5,474,811 | A | | 12/1995 | Rehfuss et al. | |
| 5,484,629 | A | | 1/1996 | Ghosh et al. | |
| 5,505,995 | A | | 4/1996 | Leonard | |
| 5,525,376 | A | | 6/1996 | Leonard | |
| 5,569,494 | A | | 10/1996 | Suzuki et al. | |
| 5,601,880 | A | | 2/1997 | Schwarte et al. | |
| 5,641,544 | A | | 6/1997 | Melancon et al. | |
| 5,733,608 | A | | 3/1998 | Kessel et al. | |
| 5,834,052 | A | | 11/1998 | Fukumura et al. | |
| 5,843,530 | A | | 12/1998 | Jerry et al. | |
| 5,985,079 | A | * | 11/1999 | Ellison | 156/244.23 |
| 6,096,396 | A | * | 8/2000 | Patton et al. | 156/230 |

* cited by examiner

WET ON WET PROCESS FOR PRODUCING FILMS

FIELD OF THE INVENTION

The present invention relates to decorative sheet materials generally, and more particularly to the manufacture of decorative sheet materials suitable for use as a flexible weatherable paint film.

BACKGROUND OF THE INVENTION

Manufacturers have shown increasing interest in using paint films in lieu of spray painting for providing a decorative surface finish for parts, such as automobile body parts. This manufacturing technique reduces the environmental concerns associated with painting and has the potential to reduce manufacturing costs. An automobile body part utilizing a plastic paint film to produce a high quality base coat/clear coat automotive finish is disclosed, for example, in U.S. Pat. No. 4,810,540, which is incorporated by reference herein. In producing the part, the paint film is typically formed into a contoured three-dimensional configuration corresponding to the shape of the outer surface of the part by suitable methods, such as by thermoforming.

Automotive manufacturers, for example, require that automotive parts have an exterior paint appearance which meets demanding performance and appearance specifications, such as weatherablility, resistance to ultraviolet light degradation, high gloss, and high distinctness-of-image (DOI). To meet these demanding requirements, paint film materials have been developed that have a number of layers of differing compositions and differing functions. For example, the paint films include a pigmented color coat layer, and where the paint film is intended to simulate the appearance of a base coat/clear coat paint finish, the film will also have an outer clear coat layer. In addition, the film may include a primer layer adhered to the color coat layer and an underlying adhesive layer as well as a thermoformable backing. The film may also have a removable protective mask layer which overlies and protects the paint film, and which can be removed after the automotive part has been manufactured.

Producing complex multilayer films of this type by conventional coating techniques requires multiple coating operations, typically performed by successive passes through a coating apparatus. The handling associated with each coating pass adds to the cost of the product and increases the opportunity for introducing flaws or defects which would result in inferior quality film materials.

SUMMARY OF THE INVENTION

The present invention addresses the problems and limitations associated with conventional coating technology and provides a process and apparatus for producing complex multilayer films with enhanced efficiency and assurance of quality. The method and apparatus of the present invention also provides the flexibility for producing various product designs or configurations.

In accordance with the present invention, multiple coating operations are performed in a single pass through the coating apparatus. The coatings are applied "wet-on-wet" as the film product is advanced through the coating apparatus. By this approach, complex multi-layer film products can be produced in a minimum number of successive passes through the coating apparatus. Multilayer films can be produced efficiently, economically and with a high assurance of quality. By reducing the number of passes required through a high temperature drying oven, product degradation is reduced. Additionally, the kinds of coatings which can be applied is expanded, making it possible, for example to apply temperature sensitive coatings or coatings of a viscosity or thickness which cannot readily be coated separately. The complex multi-layer film products can provide functional advantages that a single layer coating cannot provide.

In accordance with one broad aspect, the present invention provides a method of making a decorative sheet material comprising: directing a flexible carrier film through a coating station; depositing onto the surface of the carrier film a first coating layer of a solvent based clear coat composition; depositing onto the first coating layer a second coating layer of a solvent based pigmented color coat composition; directing the thus coated carrier film from said coating station through a drying station and drying said first and second coating layers; directing the thus coated and dried carrier film through a coating station; depositing onto the surface of the dried second coating layer a third coating layer of a solvent based primer composition; depositing onto the third coating layer a fourth coating layer of a solvent based adhesive composition; and directing the thus coated film from said coating station through a drying station and drying said third and fourth coating layers. Preferably, the first two depositing steps are performed during a first pass through said coating station, and the second two depositing steps are performed during a second pass through the same coating station.

In one embodiment the depositing steps are carried out by directing the carrier film past first and second successively arranged coaters which are mounted adjacent a cylindrical coating roll. The carrier film is guided onto the coating roll and the roll is rotated to advance the film while on the coating roll successively past the first and second coaters for depositing the first and second coating layers. In one preferred embodiment, the first and second coaters comprise respective slot coating dies mounted at spaced locations along the circumference of the coating roll. In another preferred embodiment, the first and second coaters comprise a multi-slot coating die mounted adjacent the coating roll.

The present invention also provides an apparatus for making a decorative sheet material comprising: a coating station having first and second coaters; means for supplying to the first coater of said coating station a solvent based clear coat composition; means for supplying to the second coater of the coating station a solvent based pigmented color coat composition; an unwind stand for receiving a roll of flexible carrier film; means for directing the flexible carrier film from the unwind stand through the coating station and successively past the first and second coaters for forming a first coating layer of clear coat composition on the surface of said carrier film and a second coating layer of pigmented color coat composition on the first coating layer; a drying station positioned adjacent the coating station to receive the thus coated film from the coating station and to dry said first and second coating layers; and a windup stand positioned for receiving the coated and dried film from the dryer and for winding the same into a roll. In one embodiment, the coating station includes a rotatably mounted cylindrical coating roll mounted for receiving the carrier film, and wherein first and second coaters are mounted adjacent said coating roll and successively arranged so that rotation of the coating roll advances the carrier film while on the coating roll successively past the first and second coaters for depositing the first and second coating layers.

BRIEF DESCRIPTION OF THE DRAWINGS

Figure 1:
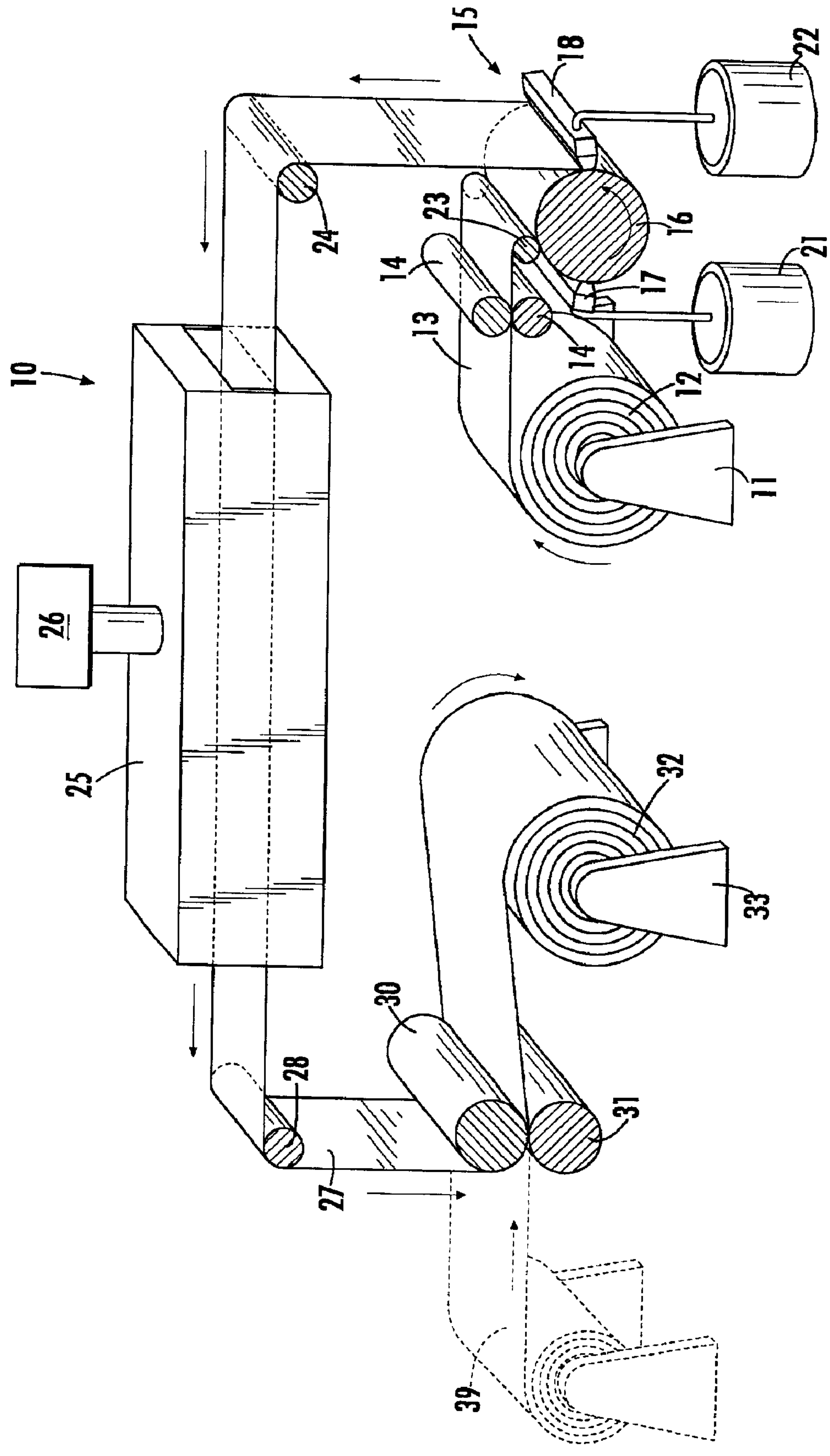
Figure 2:
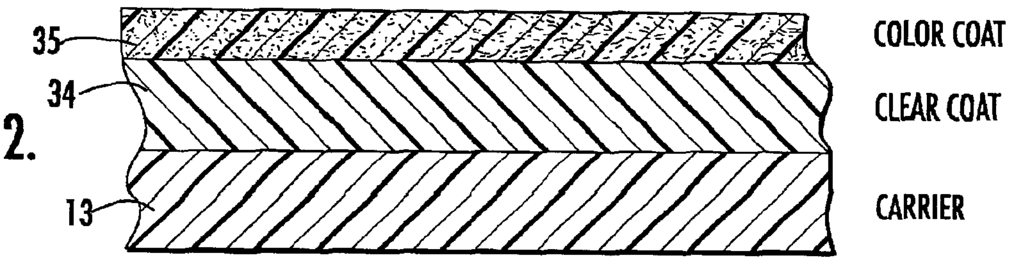
Figure 3:
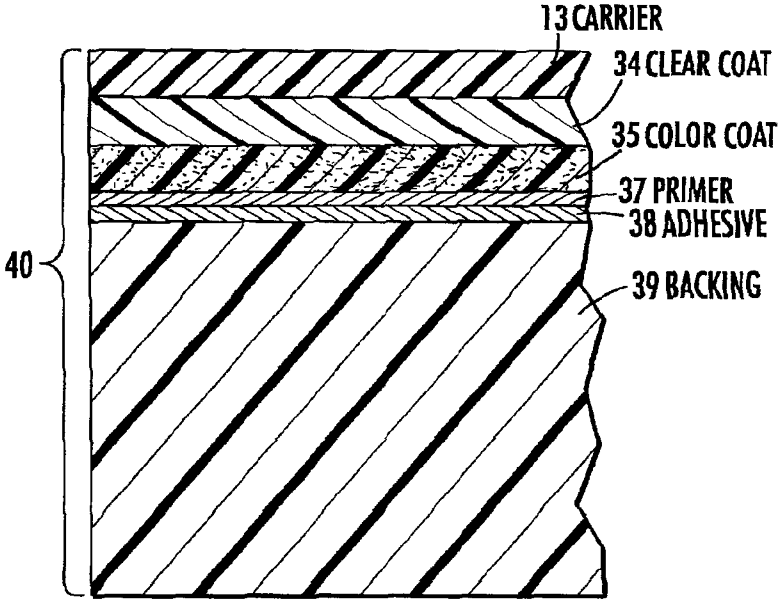
Figure 4:
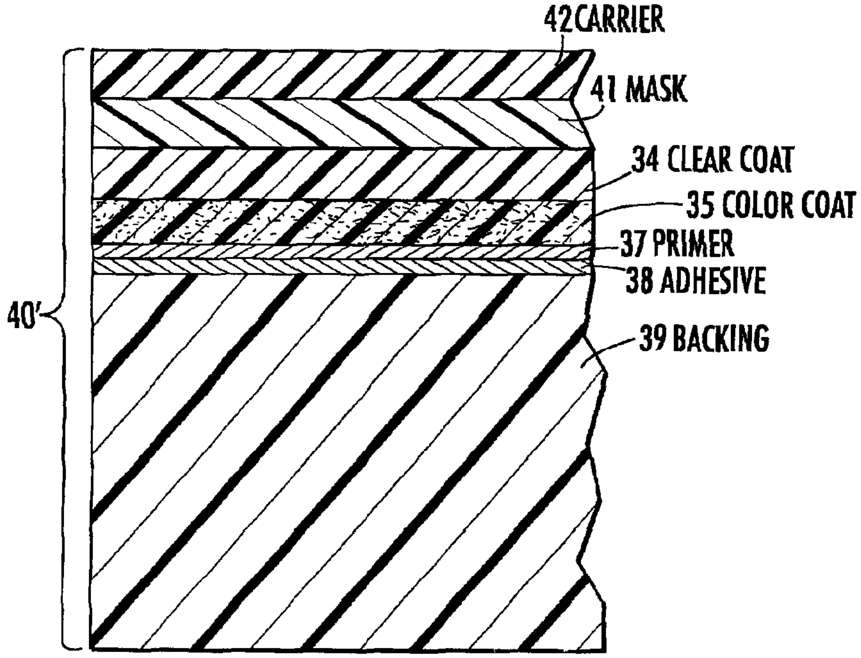
Figure 5:
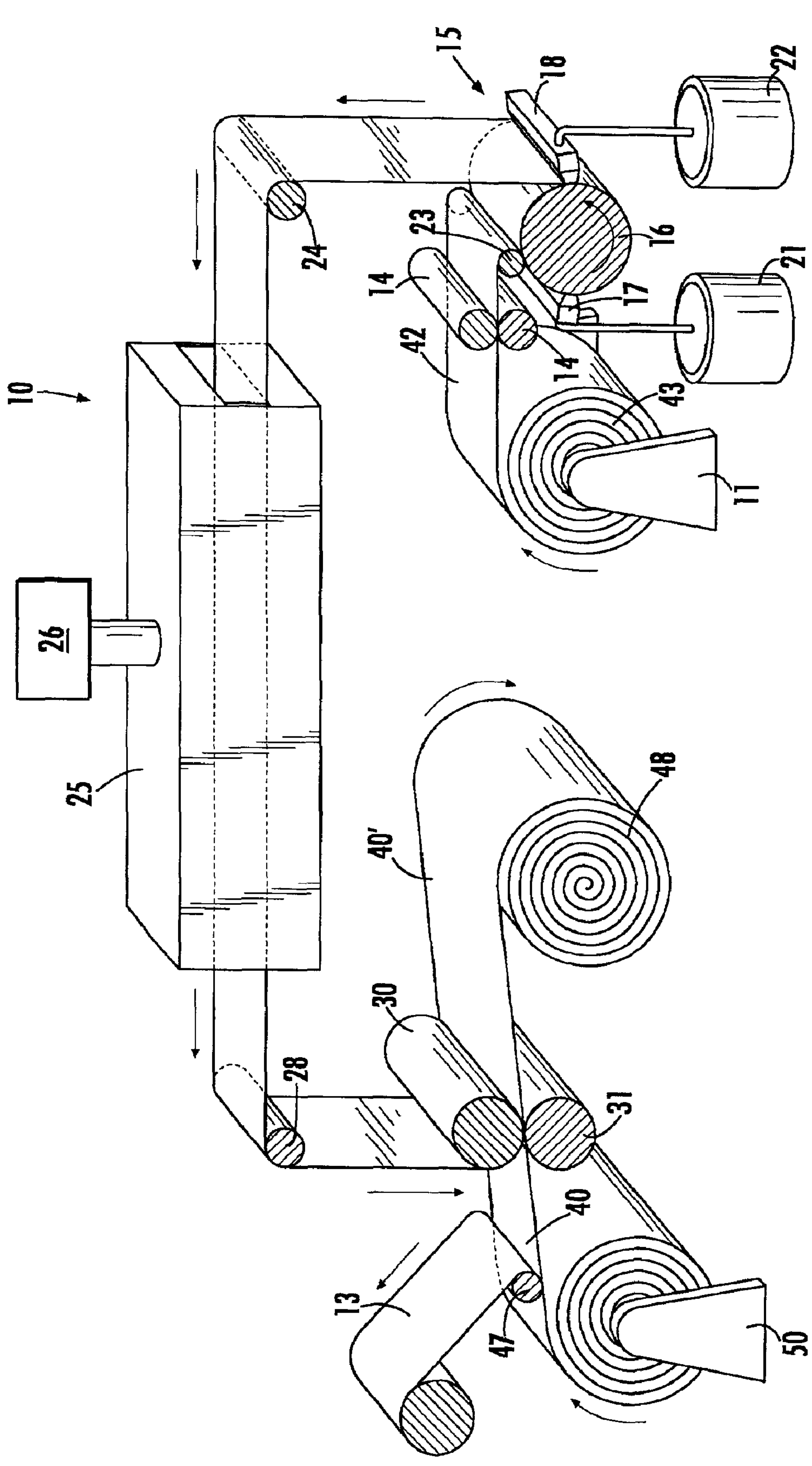
Figure 6:
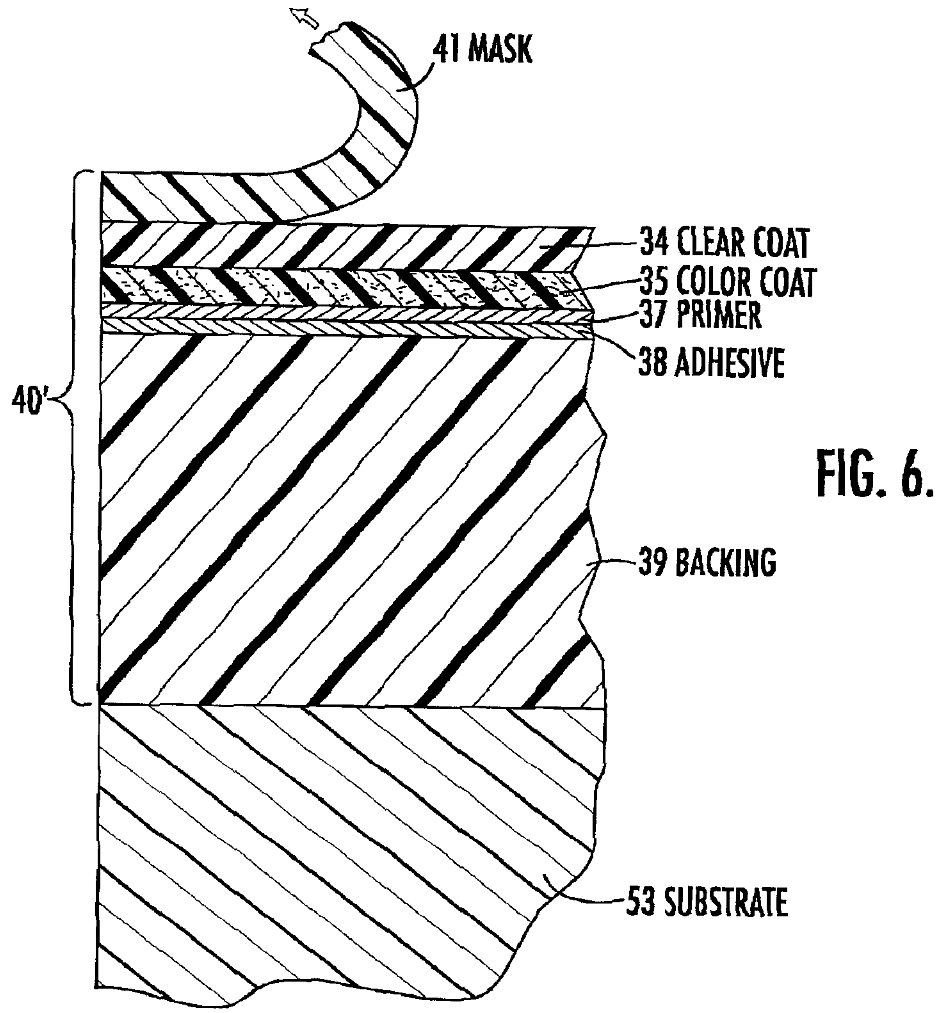
Figure 7:
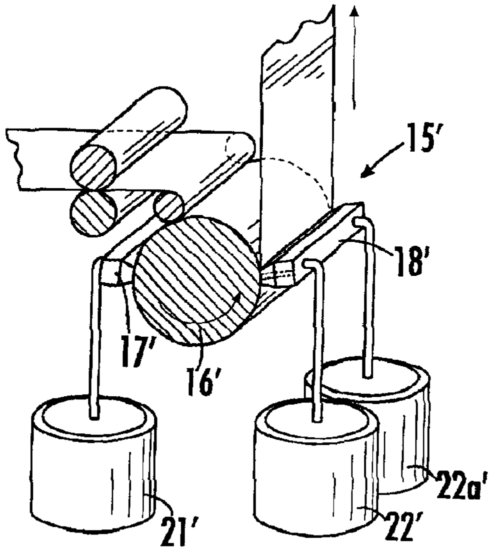
Figure 8:
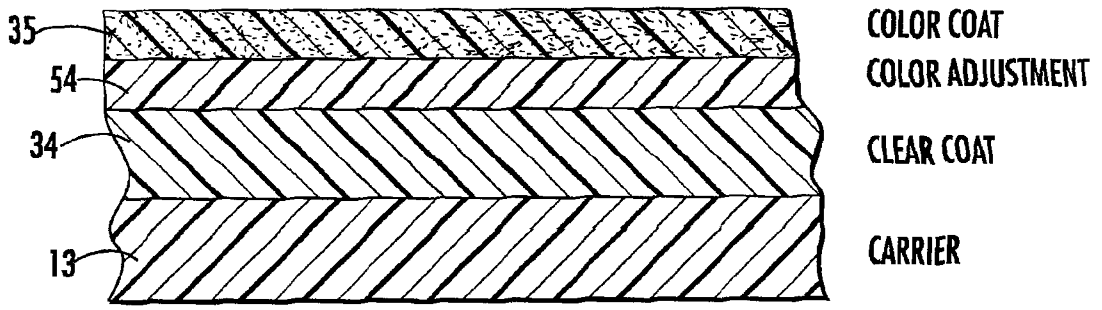
Figure 9:
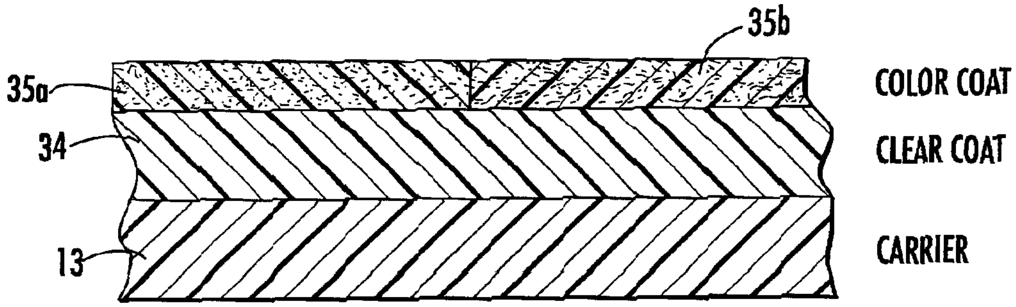
Figure 10:
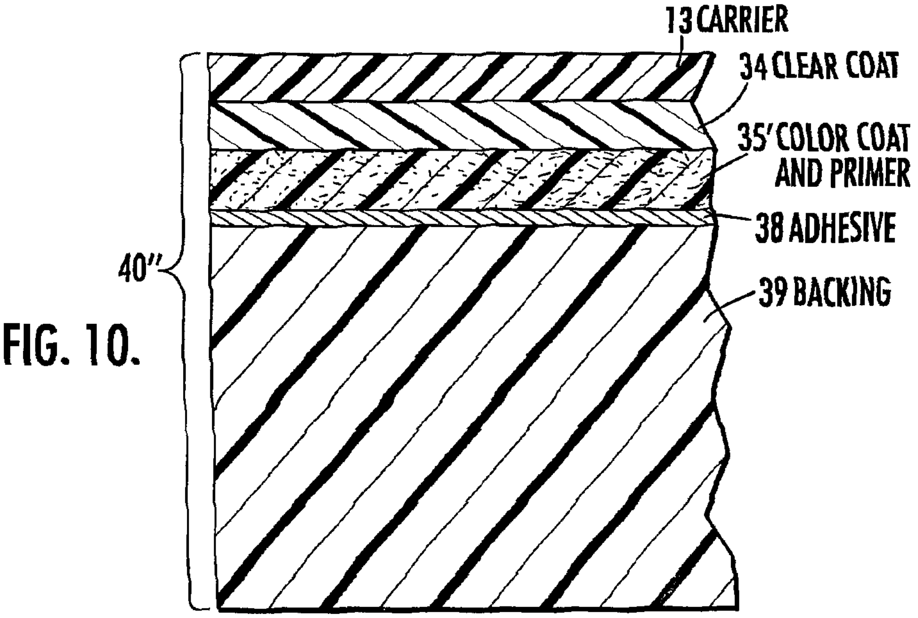

Having thus described the invention in general terms, reference will now be made to the accompanying drawings, which are not necessarily drawn to scale, and wherein:

FIG. 1 is a schematic illustration of an apparatus for making multilayered decorative sheet materials in accordance with the present invention;

FIGS. 2 and 3 are cross-sectional views of intermediate products produced on the apparatus of FIG. 1;

FIG. 4 is a cross-sectional view of a decorative sheet material in accordance with the invention;

FIG. 5 is a schematic illustration of an arrangement of apparatus utilized in the manufacture of the decorative sheet material of FIG. 4;

FIG. 6 is a cross-sectional view showing a substrate to which the decorative sheet material of FIG. 4 has been applied;

FIG. 7 is a schematic illustration of a portion of the coating apparatus configured in accordance with an alternate embodiment of the present invention;

FIGS. 8, 9 and 10 are cross-sectional views of decorative sheet material products produced in accordance with the present invention;

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 illustrates a coating apparatus 10 which can be utilized in the manufacture of decorative sheet materials in accordance with the present invention. As shown, the apparatus includes an unwind stand 11 in which is mounted a roll 12 of flexible carrier film 13. The carrier film 13 has low elongation or extensibility and preferably comprises a polyester casting film. For high gloss applications, the carrier film 13 should have a high gloss surface because it imparts high gloss and DOI to the decorative sheet material. Advantageously for high gloss applications, the carrier film 13 comprises polyethylene terephthalate (PET) in a grade without internal fillers. The carrier film 13 is about 1 to about 3 mils in thickness, preferably about 2 mils in thickness. The film 13 is unwound from the roll 12 by a cooperating pair of rolls 14 and is directed to a coating station generally indicated at 15. The coating station 15 includes a cylindrical coating roll 16 and at least two coaters mounted adjacent the coating roll. In the embodiment illustrated, a first coater 17 is mounted adjacent one side of the coating roll and a second coater 18 is mounted diametrically opposite the first coater. In the embodiment shown, both the first and second coaters 17 and 18 comprise slot die coaters. However, it should be understood that the present invention in its broad aspects could utilize various other conventional coaters such as notched (comma) coaters, knife over roll coaters and blade coaters.

If a single pigmented layer is used as the decorative paint film, the pigmented layer is deposited onto the carrier film 13 using either of the first or second coaters 17, 18. In the embodiment illustrated, however, a base coat/clear coat type of product is to be produced and the two coaters are used for applying the two coating layers. More specifically, a suitable solvent based coating composition is supplied to the first coater 17 via a pipeline from a first supply tank 21 and a suitable solvent based coating composition for the second coater 18 is supplied from a second supply tank 22. The carrier film 13 advances from the rolls 14 around a guide roll 23 and is directed onto the outer surface of coating roll 16. Coating roll 16 rotates as indicated as by the arrow, thereby advancing the carrier film 13 successively past the first coater 17 where a uniform thin film layer 34 (FIG. 2) of solvent based coating composition is deposited onto the surface of the carrier film. The carrier film then advances past the second coater 18 where a second thin film layer 35 (FIG. 2) of coating composition from the second supply tank 22 is deposited onto the undried first layer 34 (FIG. 2) of coating composition.

The film 13 with the wet or undried coating layers 34, 35 (FIG. 2) thereon then advances around a turning roll 24 and is directed into and through an elongated drying oven 25. The oven is heated in a conventional manner, preferably by forced hot air. As the film is heated, the solvents in the coating layers are evaporated and the coating layers are dried. The solvent vapors are recovered by a conventional solvent recovery system 26 or destroyed by an ecologically sound and approved method. Preferably the drying oven 25 has multiple heating zones wherein each successive heating zone operates at a progressively higher temperature. For example, an oven having four to six heating zones ranging in temperature from about 200° F. to about 400° F. may be used.

Upon emerging from the drying oven 25, the thus formed intermediate film product 27 passes around a turning roll 28. The film product 27 then passes around the upper one of a pair of cooperating rolls 30, 31 which form a nip and serve to advance the carrier film 13 in its path of travel and to maintain it at a suitable tension for processing and handling. Upon leaving the nip rolls 30, 31, the film is wound into a roll 32 at a windup stand 33.

FIG. 2 shows the cross section of the intermediate film product 27 produced as just described by directing an uncoated carrier film 13 through the coating apparatus 10 and forming first and second coating layers 34, 35 thereon. The particular intermediate film 27 product shown in FIG. 2 is used in the manufacture of a base coat/clear coat type of paint film. Consequently, the first coating layer 34 is produced from a solvent based clear coat composition and the second coating layer 35 is produced from a solvent based pigmented color coat composition. The clear coat of the first coating layer 34 is formed from a substantially transparent weatherable polymer composition selected to provide a film that will not significantly fade, peel, crack, or chalk when exposed to the environment for the intended life of the film. Additionally, the clear coat layer must be formable from a two-dimensional surface to a three-dimensional surface without objectionable loss of appearance or performance properties. Advantageously, the clear coat layer is selected from the group consisting of urethane polymers, acrylic polymers, fluoropolymers, and alloys of a fluoropolymer and an acrylic polymer (such as FLUOREX® films). The clear coat layer may include UV screeners, antioxidants, heat stabilizers, and other conventional additives. Preferably, the clear coat layer is about 0.3 to about 3 mils in thickness.

The second coating layer 35, which is applied at the second coater 18, forms the color coat layer of the paint film and is formed of a polymer composition containing a uniformly dispersed pigment to provide the appearance necessary for exterior automobile use. Preferably, the color coat composition is selected from the group consisting of urethane polymers, acrylic polymers, fluoropolymers, and alloys of a fluoropolymer and an acrylic polymer (such as FLUOREX® films). The color coat layer may include additional pigments, dyes and/or flakes to enhance visual appearance and improve weatherability. Preferably, the color coat layer is about 0.3 to about 3 mils in thickness.

The roll 32 of intermediate film product 27, produced as described above, may now be directed through the coating apparatus of FIG. 1 for a second pass during which two additional coating layers 37, 38 (FIG. 3) of primer and adhesive, respectively, are deposited and a thermoformable backing layer 39 (FIG. 3) is laminated to the thus-formed multi-layer film product to produce a thermoformable film product 40. Thus, after its second pass through the coating apparatus 10, the multilayer thermoformable decorative sheet material product 40 has a cross section similar to that shown in FIG. 3, and includes the carrier film 13, the clear coat layer 34, the pigmented color coat layer 35, a primer layer 37, an adhesive layer 38, and a thermoformable backing layer 39. The thermoformable backing layer 39 provides bulk and/or rigidity for handling the decorative sheet material as a thermoformed preform. The backing layer also provides thickness to prevent glass fibers, fillers or other sources of visual roughening or "orange peel" from the underlying substrate from affecting the visual appearance of the decorative sheet material. The backing layer must bond well with both the substrate and the adhesive layer 38. The backing layer may be selected from the group consisting of thermoplastic olefin (TPO), acrylonitrile-butadiene-styrene (ABS) terpolymer resin, polypropylene, thermoplastic polyamide, polyethylene oxide, polycarbonate, polyvinyl chloride, polystyrene, styrene/polyphenylene oxide (NORYEL), polybutylene terephthalate, nylon, PETG copolyester, and mixtures, laminates and copolymers thereof, depending on the material used as the substrate.

The coating apparatus 10 as used during the second coating pass is configured substantially as is shown in FIG. 1. As shown by dotted lines in FIG. 1, the thermoformable backing layer 39 is advanced from a supply roll and is directed into the nip and into contact with the adhesive layer 38 present on the advancing multilayer product. After passing through the nip, with suitable application of pressure and heat, the multilayer thermoformable decorative sheet material product 40 is produced. The product 40 is taken up in the form of a roll for subsequent handling and processing.

During the second pass through the coating apparatus 10, a primer layer 37 is formed on the pigmented color coat layer 35 at the first coater 17 and an adhesive layer 38 is formed on the undried primer layer 37 at the second coater 18. The primer layer 37 improves adhesion between the color coat layer 35 and the adhesive layer 38. The primer layer 37 preferably comprises acrylic polymer prepared in solution using any compatible solvent known in the art, such as toluene. In one embodiment, the primer layer 37 is prepared from a solution comprising about 20 to about 40 weight percent acrylic composition and about 60 to about 80 weight percent solvent. An acrylic polymer suitable for use in the primer layer 37 is acrylic adhesive 68070 manufactured by DuPont. The primer layer 37 may be opaque, colored or clear. The primer layer 37 is preferably about 0.2 to about 2 mils in thickness. The primer layer 37 may be colored or opaque to protect an underlying thermoformable backing layer from damage caused by UV exposure. Pigments, such as carbon black, titanium oxide, and mixtures thereof may be added to impart color to the acrylic polymer composition used in the primer layer. Additionally, additives such as UV screeners, antioxidants and heat stabilizers may be added to the composition of the primer layer 37.

The adhesive layer 38 is provided for adhering the decorative paint film to a thermoformable backing layer 39. The adhesive layer 38 comprises one or more layers selected from the group consisting of urethane adhesives, acrylic adhesives, acrylic adhesives with cross linkers, chlorinated polyolefins and mixtures thereof. Preferably, a mixture of a chlorinated polypropylene and a higher molecular weight chlorinated polyolefin is used. In one embodiment, the adhesive layer 38 is prepared from a mixture of about 5 to about 20 weight percent chlorinated polypropylene and about 1 to about 10 weight percent of a higher molecular weight chlorinated polyolefin formed in solution. A compatible solvent known in the art, such as toluene, is present in an amount of about 60 to about 80 weight percent. A chlorinated polypropylene suitable for use with the present invention is HARDLEN 13LP manufactured by Advanced Polymer. A higher molecular weight chlorinated polyolefin suitable for use with the present invention is SUPERCHLON 822S manufactured by CP/Phibrochem of Fort Lee, N.J. The adhesive layer 38 should be capable of stretching about 300 to about 600 percent. Due to the substantial elongation capability of the adhesive layer 38, the adhesive layer maintains the necessary adhesive strength to prevent delamination of the decorative paint film from the thermoformable backing layer 39 over a wide temperature range.

An epoxy component, such as EPON 828RS manufactured by Shell Chemical, may be added in small amounts (approximately about 0.1 to about 2.0 weight percent on a dry solids basis) as an acid scavenger. As with the primer layer 37, the adhesive layer 38 may be colored or opaque to protect the underlying thermoformable backing layer from damage caused by UV exposure. Pigments, such as carbon black, titanium oxide, and mixtures thereof, may be added to impart color to the polymer composition used in the adhesive layer 38. Additives such as UV screeners, antioxidants, and heat stabilizers may be added to the adhesive layer 38. Preferably, the adhesive layer 38 is about 0.2 to about 2 mils in thickness.

In a subsequent operation, the coating apparatus 10, with minor modifications, may be utilized to produce an extensible mask layer 41 and to laminate the mask layer 41 to the clear coat layer 34 of the multilayer thermoformable decorative sheet material product 40'. The resulting end product is shown in cross section in FIG. 4. It is intended that the carrier layer 42 be removed prior to thermoforming.

The coating apparatus 10 is shown in FIG. 5 as it would be configured for manufacturing the extensible mask layer 41 and for laminating it to the multilayer thermoformable decorative sheet material product 40. To avoid repetitive description, elements of the coating apparatus 10 which are the same as in the FIG. 1 configuration are identified by the same reference characters, and elements which are different will be identified by different reference numbers. As shown in FIG. 5, another flexible carrier film 42 is unwound from a roll 43 and is directed to the coating station 15. The flexible carrier film 42 has low elongation and extensibility. One suitable film for this purpose is a polyester film, and a polyethylene terephthalate (PET) film is particularly preferred. The carrier film 42 is about 1 to 3 mils in thickness, preferably about two mils in thickness and it may comprise a film with high gloss and no slip additives or a film containing slip additives can be suitably used if desired.

Preferably, the extensible mask layer 41 is about 0.3 mils to about 3.0 mils in thickness. The extensible mask layer includes a film-forming polymer component. Preferably, the film-forming component is selected from the group consisting of polyurethane, polyolefin, polyester, polyamide, and mixtures thereof. In one embodiment, the film-forming polymer component comprises an aliphatic or aromatic polyester or polyether polyurethane in the form of a dispersion or a solution. For example, polyurethane polymers QA 5218 and QA 5026, manufactured by Mace Adhesives and Coatings of Dudley, Mass., may be used to form the mask layer 41. In one embodiment, the mask layer 41 comprises about 85 to about 99.5 weight percent polyurethane waterborne dispersion. Advantageously, a small amount of surfactant (about 0.05 to about 0.2 weight percent), such as SURFYNOL 104H manufactured by Air Products of Allentown, Pa., is added to lower surface tension.

The mask layer 41 may optionally contain a particulate filler dispersed in the film-forming polymer component for the purpose of controllably altering the gloss of the paint film. The particulate filler is preferably selected from the group consisting of fumed silica, talc, calcium carbonate, clay, alumina, and mixtures thereof. However, other particulate fillers that are compatible with the film-forming polymer component may be used without departing from the present invention. Advantageously, the particulate filler is chemically inert. In one embodiment, the particulate filler dispersed in the polymer component is present at a concentration sufficient to controllably alter the gloss appearance of the underlying paint film after forming and upon removal of the mask layer. The concentration of the particulate filler will depend largely on the desired gloss of the final product. Different levels of particulate filler may be utilized in order to produce different levels of gloss reduction in the final product. A greater concentration of particulate filler in the mask layer 41 will generally provide a lower final gloss value in the resulting paint film. For example, if only relatively slight reduction in gloss is desired, the particulate filler may be present in the mask layer at a concentration of about 0.5 weight percent of the mask layer on a dry solids basis.

The mask layer 41 composition may include additional additives designed to migrate into the clear coat layer 34 to enhance weatherability or other desirable properties of the clear coat layer or to prevent migration of additives from the clear coat into the mask layer. Migratory additives suitable for use with the present invention include, but are not limited to, hardness enhancers, release agents, ultraviolet light stabilizers, antioxidants, dyes, lubricants, surfactants, catalysts, and slip additives.

More specifically, the migratory additives useful in the present invention include benzophenone, silicones, waxes, triazoles, triazines and combinations thereof. The migratory additives are encouraged to migrate into the outer surface of the clear coat layer 34 by the heat and/or pressure present during thermoforming or molding processes. Additionally, the presence of these additives in the mask layer 41 prevents migration of additive components from the clear coat layer 34 into the mask layer.

Ultraviolet light stabilizers, such as TINUVIN 1130 and TINUVIN 292, both manufactured by Ciba Geigy of Hawthorne, N.Y., can be added as migratory additives in the mask layer composition. Silicone additives, such as BYK333 manufactured by BYK Chemie of Wallingford, Conn., can be added to lower the coefficient of friction of the clear coat layer 34. The migratory additives are generally added in amounts ranging from about 0.01 to about 2.0 weight percent, with all additives accounting for no more than about 5.0 weight percent of the mask layer composition.

The flexible carrier film 42 is advanced through the coating station 15 and a film-forming polymer composition for producing the mask layer 41 is applied to the carrier film. The composition can be applied using one or both of the coaters 17, 18. The coated carrier film 42 is advanced through the drying oven 25 and the coating is dried, resulting in the formation of an extensible mask layer 41 releasably adhered to the carrier film 42.

The previously produced roll of multilayer thermoformable decorative sheet material product 40 is mounted at an unwind stand 50 located adjacent to the cooperating nip rolls 30, 31. Preferably, at least one of the rolls 30 and 31 is heated. The multilayer thermoformable decorative sheet material product 40 has the carrier film 13 side located outermost and the thermoformable backing layer side 39 facing inwardly. As the sheet material product 40 is advanced upwardly from the roll, the carrier film 13 is stripped free from product 40 by turning around a sharp angle over a turning rod 47, thereby exposing the clear coat layer 34. As the mask layer 41 and flexible carrier 42 pass through the nip, the mask layer 41 is brought into contact with the exposed clear coat layer 34 of the decorative sheet material product 40 and is releasably bonded to the clear coat layer 34 under the heat and pressure of the nip. The resulting composite sheet material 40' (FIG. 4) is taken up in the form of a roll 48. In subsequent use, the flexible carrier 42 is removed from the product.

The composite multilayer decorative sheet material 40' can be combined with a substrate material to form a decorative outer surface for the substrate. For example the material 40' can be bonded to an already produced substrate. Alternatively, the sheet material 40' can be utilized in an in-mold surfacing operation. In this case, the sheet material 40' can be formed into a three dimensional configuration, placed within a mold, and the substrate material can be injection molded behind the preformed sheet material 40' and becomes fused or bonded to the thermoformable backing layer to form a composite shaped part. FIG. 6 shows a greatly expanded cross sectional view of a molded part comprising the decorative sheet material 40' adhered to a substrate 53 formed by injection molding.

The extensible mask layer 41 is provided to assist in controlling the gloss and DOI during forming processes and molding processes. Forming processes include, but are not limited to, thermoforming, cold stretching and vacuum forming. Molding processes include, but are not limited to, injection molding, compression molding and blow molding. The mask layer 41 also adds strength to the decorative sheet material and improves process uniformity during the thermoforming process. Additionally, the mask layer protects the underlying layers of the decorative sheet material from scratching or marring until the part is ready for display. The mask layer is capable of stretching up to about 600% during thermoforming and has a room temperature elongation at break of at least about 200%. Room temperature is defined as about 15° C. to about 30° C.

The mask layer 41 may be retained as the outer layer of the decorative sheet material during construction of the final product, such as an automobile. Thereafter, the mask layer may be removed to reveal the underlying decorative paint film. For instance, the extensible mask layer can be maintained as a protective layer and removed only after the vehicle has completed shipment and is ready for delivery to a customer. The extensible mask layer is releasably bonded to the underlying decorative paint film and may be stripped away from the underlying layers in a single piece. In a preferred embodiment, the mask layer is transparent or substantially transparent to permit visual inspection of the part for surface defects without removal of the mask layer.

Additionally, the extensible mask layer maintains uniform gloss and DOI during injection or compression molding, such as thermoplastic or thermoset compression molding, where the mold is roughened or deglossed. Roughened molds are less expensive than highly polished molds and are also functionally superior to highly polished molds because the rough mold surface enhances air removal from the mold as the mold closes. The extensible mask layer protects the paint film from damage caused by the mold without resorting to the use of highly polished molds.

FIG. 7 illustrates an alternate form of the coating station. To avoid repetitive description, parts in FIG. 7 which correspond to those previously discussed in connection with FIG. 1, will be identified by the same reference numbers with prime notation added. As can be readily seen from comparing FIGS. 1 and 7, the coating station 15' of FIG. 7 is similar in many respects to that of FIG. 1. The principal difference is that the second coating station 18' is a dual slot die coater comprising two slots extended substantially parallel to one another. The two slots of the die 18' are supplied with coating composition from respective supply tanks 22', 22*a*'. Thus, with this configuration of apparatus, it is possible to apply three coating layers wet-on-wet in a single pass. Depending upon the coating compositions supplied to the dual slot die 18' and the configuration of the slots, various unique products can be produced.

FIG. 8 illustrates one such product which can be produced during the first pass of the carrier film 13 through the coating station. In this product, a clear coat composition 34 is applied at the first coating station 17' as in the FIG. 1 embodiment. At the second coater 18', a color adjusting layer 54 is applied from the first of the two successively arranged slots and a pigmented color coat layer 35 is applied from the second slot.

FIG. 9 shows still another product configuration whereby a two-tone striped appearance can be produced in a single pass through the coating station 15'. In this arrangement, the two slots of the dual slot die coater 18' are blocked along a portion of their length and are open along the remaining portion of their length. As in the previous embodiment, the first coater 17' applies a clear coat composition. The dual slot die applies two pigmented coating compositions of different colors. Thus, a first pigmented coating composition 35*a* is applied over a portion of the width of the advancing sheet material from the first slot and a second coating composition 35*b* of a different color is applied over the remaining portion of the width of the sheet material from the second slot. The resulting sheet material has a striped or two-tone appearance. The dual slot die arrangement has several advantages over known slide coating or cascade coating techniques. It eliminates viscous flow down the slide and the problem of drying on the slide, and it provides the capability of a broader viscosity and thickness range.

FIG. 10 illustrates another product configuration which may be produced with the process and apparatus of the present invention. This product 40" is similar to the product 40 of FIG. 3 described above, except that instead of a separate color coat 35 and primer coat 37 the primer coating composition has color and serves as both the color coat layer and the primer. This combined color and primer coat layer 35' contains pigments and optionally also reflective flakes, depending upon the color appearance desired. Using an apparatus configured as in FIG. 1, the clear coat layer 34 and the pigmented primer coat layer 35' may be successively applied to the carrier film 13 and thereafter dried to form the intermediate film product 27. In a subsequent pass through the apparatus, an adhesive layer 38 and backing layer 39 can be applied to the intermediate film product 27 to produce the multilayer thermoformable decorative sheet material product 40". The backing layer 39 may either be laminated to the adhesive coated intermediate film product, or alternatively, the backing layer may be applied by extrusion coating a thermoplastic polymer layer directly onto the adhesive-coated intermediate film product.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of making a decorative sheet material comprising:

(a) directing a flexible carrier film through a coating station;

(b) depositing onto the surface of the carrier film a first coating layer of a solvent based clear coat composition;

(c) depositing onto the first coating layer a second coating layer of a solvent based pigmented color coat composition;

(d) directing the thus coated carrier film from said coating station through a drying station and drying said first and second coating layers;

(e) directing the thus coated and dried carrier film through a coating station;

(f) depositing onto the surface of the dried second coating layer a third coating layer of a solvent based primer composition;

(g) depositing onto the third coating layer a fourth coating layer of a solvent based adhesive composition;

(h) directing the thus coated film from said coating station through a drying station and drying said third and fourth coating layers, wherein said depositing steps (b) and (c) are performed during a first pass through said coating station, and said depositing steps (f) and (g) are performed during a second pass through the same coating station.

2. A method according to claim 1, wherein said depositing steps (b) and (c) are carried out by directing said carrier web past first and second successively arranged coaters.

3. A method according to claim 2, wherein said first and second coaters are mounted adjacent a cylindrical coating roll, and wherein said directing step (a) comprises guiding the carrier film onto said coating roll and rotating the coating roll to advance the film while on said coating roll successively past said first and second coaters for depositing said first and second coating layers.

4. A method according to claim 3, wherein said first and second coaters comprise respective slot coating dies mounted at spaced locations along the circumference of said coating roll, and said depositing steps (b) and (c) are carried out by directing a film of each said coating compositions from the respective slot dies and directly onto the adjacent exposed surface.

5. A method according to claim 3, wherein said first and second coaters comprise a multi-slot coating die mounted adjacent said coating roll, and said depositing steps (b) and (c) are carried out by directing said carrier web past said multi-slot coating die and directing a film of each said coat composition from respective die slots of said multi-slot die.

6. A method according to claim 1, wherein said depositing step (b) comprises applying to the surface of the carrier film a coating of a fluoropolymer composition in a volatile organic solvent composition containing at least one high boiling solvent component selected from the group consisting of dimethyl phthalate ("DMP") and diethylene glycol monobutyl ether acetate ("DBA").

7. A method according to claim 1, including the further step of directing one surface of a thermoformable backing layer into contact with the fourth coating layer of adhesive and laminating the backing layer to the decorative sheet material.

8. A method according to claim 7, wherein the step of directing a thermoformable backing layer into contact with the fourth coating layer comprises directing one surface of a sheet of a thermoplastic olefin or an acrylonitrile-butadiene-styrene resin into contact with the fourth coating layer of adhesive and passing the layers through the nip of a pair of cooperating rolls to laminate the backing layer to the decorative sheet material.

9. A method according to claim 1, including the further steps of:

(i) directing a flexible carrier film through a coating station;

(j) depositing onto the surface of the carrier film a coating layer of a mask coat composition;

(k) directing the thus coated film from said coating station through a drying station and drying said coating layer to form an extensible mask layer releasably carried by said carrier film;

(l) advancing the thus coated and dried carrier film with said mask layer thereon along a path of travel toward a heated nip;

(m) advancing the coated film from step (h) along a path of travel toward said heated nip with the coated surface oriented toward the mask layer of said film;

(n) stripping the flexible carrier film from said coated film to expose said first coating layer; and (o) applying heat and pressure to the films as they pass through said nip to bond said mask layer to said first coating layer.

10. A method according to claim 9, including the further step of stripping the carrier film from said mask layer.

* * * * *